United States Patent Office 2,906,723
Patented Sept. 29, 1959

2,906,723

EPOXY RESIN COMPOSITIONS OF IMPROVED HEAT HARDENING CHARACTERISTICS AND THE PROCESS OF THEIR PRODUCTION

Johannes Reese, Wiesbaden-Biebrich, Germany, assignor to Chemische Werke Albert, Wiesbaden-Biebrich, Germany, a corporation of Germany No Drawing. Application December 13, 1955
Serial No. 552,698

14 Claims. (Cl. 260—42)

This invention relates to a process for improving the hardening or curing characteristics of epoxy resins, or resin compositions, and to the resulting resins or resin compositions.

It is known that the so-called epoxy- or ethoxylin resins are obtained by condensing in an alkaline medium diphenols with sufficient epi- or dihalogenhydrin, respectively, such that the obtained epoxy resin contains only epoxide terminal or end groups; and that soluble addition products of such epoxy resins with polyamines are especially useful as hardening or curing agents. Such addition products, apart from the ether bonds and aliphatic hydroxy groups, contain only a plurality of amino groups which are capable of entering into further reactions. It is considered that the amino groups react with the epoxide groups of the epoxy resin with the formation of a poly-dimensional network and that, provided the proper quantitative ratios are used, a thorough hardening is obtained.

Since such reaction can take place at room temperature, hardening can be obtained in the cold as well as with the application of heat. Due to the great reactivity of these known hardening agents, however, the period of use or "pot-life" of the finished resin-hardener mixtures or solutions is relatively short.

Thus there has existed a very great need for hardening agents for epoxy resins which will form hardenable epoxy resin compositions with a longer "pot-life." I have now found that adducts of polyamines with reaction products of diphenols and less than on molar proportion of epi- or dihalogenhydrins, respectively, meet this need. Normally the ratio of diphenol to halogenhydrin in such adducts is typically from about 1:0.5 to about 1:0.9. Such adducts differ basically from the addition products of polyamines and conventional epoxy resins as described above since they still contain phenolic OH-groups in the molecule. It is surprising that epoxy resins capable of being hardened can be converted by such adducts into chemically stable products, especially when applying moderate temperatures and short hardening periods.

The condensation products on which the new adducts are based, which have a molar ratio of diphenol to epi- or dihalogenhydrin less than 1, are manufactured in a known manner in an alkaline medium. Such condensation products have not heretofore been used industrially since, either alone or after the addition of known basic or acid hardening media, they are not capable of being hardened. Although their content of epoxide groups can be relatively large, their "epoxy-equivalent" is nevertheless smaller than 1, i.e. for each diphenol one uses less than one epoxide group and correspondingly in the condensation products the number of phenolic hydroxy groups exceeds the number of epoxide groups. Also the content of epoxide groups, apart from the ratio of diphenol to halogenhydrin, depends to a great extent upon reaction conditions. Reaction conditions suitably can be chosen such the diphenol is just about completely converted and the further condensation of the epoxy groups with phenolic OH-groups is kept as low as possible. The use of dilute alkaline solutions and the utilization of shorter reaction periods are effective in obtaining this desirable result.

Thus it will be seen that there is a basic difference between conventional epoxy resins and the condensation products from which the adducts of this invention are derived. Conventional epoxy resins have an "epoxy-equivalent" greater than 1 while the adducts of this invention, as stated, are derived from condensation products having an "epoxy-equivalent" less than 1. Such substances are basically different from a chemical viewpoint since they have free or unreacted epoxy and phenolic hydroxy groups, respectively, and are encompassed in the said concept of "epoxy-equivalent."

The formation of the adducts hereof from the condensation products of diphenols with epi- or dihalogenhydrin can be obtained through reacting the components in admixture with one another or in a solvent but the amine can also be added to the incompletely condensed resin immediately after the consumption of the epi- or dihalogenhydrin. The reaction can be obtained in the cold or by the application of heat. In contradistinction to the production of addition products from the conventional epoxy resin capable of being hardened, which have an epoxy equivalent larger than 1, in deriving the adducts hereof no hardening is to be feared, especially when adding less than 1 mol of polyamine per epoxide group of the condensation product derived from the diphenol and halogenhydrin. Thus it is much simpler to produce the adducts of this invention than it is to produce the addition products of conventional epoxy resins and polyamines.

Various known polyamines may be used in the formation of the adducts of this invention. Aliphatic diamines whose amino groups are separated by 2 or 3 methylene groups, such as ethylenediamine, diethylenetriamine, dipropylenetriamine, triethylenetetramine, tetraethylenepentamine, asymmetric N-dimethyl-1, 3-diaminopropane, etc. are especially well suited for the purposes of this invention. Triethylenetetramine is particularly advantageously used since adducts formed therewith, due to the presence of a plurality of amino groups, develop an especially strong hardening effect. The epoxy resin used for the formation of the adducts hereof, having an epoxy equivalent smaller than 1, are derived from reagents heretofore used in the production of epoxy resins. Preferably p,p'-dihydroxydiphenylpropane, or bisphenol, is used but also other mononuclear or multinuclear diphenols can be used such as, for instance, hydroquinone, resorcinol o,p'-dihydroxydiphenylmethane, dihydroxydicresylmethanes, dihydroxybenzophenones, etc. Likewise the halogenhydrins used herein are those heretofore known as suitable for the production of epoxy resins. Among the halogenhydrins, epichlorohydrin is preferred but epibromhydrin, dichlorhydrin or dibromhydrin can be used also. For economic reasons the dihydroxydiphenyl chlorohydrin epoxy resins are preferred. In forming adducts alkali solutions are used in a quantity equivalent to that of the halogen content of the halogenhydrin used in the condensation.

The amount of polyamines used in forming the adducts of this invention naturally will be related to the number of amine-reactive groups in the epoxy resin having an epoxy number less than 1 although an excess of polyamine may be used. Also it is at times desirable not to use sufficient polyamine to react with all of the amine-reactive groups in the epoxy resin. In general, the amount of polyamine used may be of the same order as that used in making the polyamine addition products of epoxy resins having an epoxy number greater than 1 known in the prior art. Typically the amount of polyamine used is less than the amount of epoxy resin having an epoxy number less than 1 and may vary from a very small percent of the weight thereof up to 60% or more of its weight, say, from about 3 to about 60% of its weight.

In the hardening of the epoxy resins with the polyamine adducts of this invention the components are mixed with one another with or without the use of solvents depending upon the intended use. In order to obtain especially chemically stable hardened products the components of the composition to be hardened must be selected with special care. The relative proportions selected will depend upon the epoxy content of the epoxy resin capable of being hardened and on the amine content of the adduct being used as the hardening agent. The most favorable relationship is determined from case to case by tests. The hardening period varies inversely with the temperature, i.e. the higher temperatures require shorter periods of heating, and vice versa. If, for instance, lacquers are to be manufactured, they may be obtained by heating for say 1 hour at 70° C. or by heating for ¼ hour at 150° C. At still higher temperatures correspondingly shorter periods are needed. Up to 170° C. substantially no yellowing appears. Beyond this stoving or hardening temperature, depending upon the period of heating, the hardened films become increasingly darker and more brittle. Therefore hardening or stoving temperatures of about 50 to 170° C. should preferably be used.

In the manufacture of two component lacquers with the polyamine adducts hereof, epoxy resins which are not too highly condensed, say those having a molecular weight of about 1,000, have been proven to be particularly useful. Lacquer solutions prepared from such resins and adducts are stable for a comparatively long time at normal room temperatures, i.e. they have a very good pot life. A substantially unlimited storage stability is obtained by mixtures of powdered epoxy resins and powdered adducts.

The amount of adduct hardening agent used in the hardenable epoxy resins of this invention may vary within wide limits depending upon the nature of the hardenable epoxy resin and the nature of the adduct and, as well, upon the desired properties of the resulting resin composition. Even small amounts of the adduct may have a material effect upon the hardening properties of the epoxy resin having an epoxy equivalent greater than 1. In general, due to the presence of reactive phenolic OH-groups, adducts of this invention with a given polyamino content can be used in lesser quantities than the corresponding known addition products of epoxy resins having an epoxy equivalent greater than 1. Likewise, adducts of this invention may be used to obtain a desired hardening effect with a lesser polyamino content than would be necessary in the corresponding addition products derived from epoxy resins having an epoxy equivalent greater than 1. Customarily a minor amount of the adduct of this invention is added to the hardenable epoxy resin composition. Typically satisfactory results are obtained by utilizing the adduct as a hardening agent in amounts equaling 15 to 50% of the weight of the hardenable epoxy resin although larger and smaller amounts may be used, say from 10%, 100%, or more, of the weight of the epoxy resin having an epoxy number greater than 1.

The hardened products of this invention are extremely waterfast and chemically inert. They are characterized especially by very good stability to hot alkalis and acids. Beyond this, they exhibit excellent mechanical characteristics since even with a good hardness, they exhibit cohesive elasticity. The excellent stability to alkali is proof that the phenolic OH-groups of the new polyamine adducts react with the epoxy groups of the hardenable epoxy resin. Usually the reaction with the OH-groups takes place at acceptable speeds only at temperatures around 150° C. It is to be assumed that due to the numerous amine groups of the polyamine adduct an alkali medium is developed which catalyzes the hardening reaction even at room temperatures but preferably, however, at temperatures above 70° C.

The hardening reactions of this invention can be utilized for the production of lacquers, resins to be used for adhesive purposes and molding resins.

In order that the invention may be more fully understood the following examples, in which parts are expressed as parts by weight, are given for illustrative purposes only.

*Example 1*

Two hundred twenty-eight (228) parts of p,p'-dihydroxydiphenylpropane are dissolved in 720 parts of a 5% sodium hydroxide solution and condensed at 40° C. with 83 parts of epichlorhydrin, the temperature being increased to 70° C. within half an hour. After the introduction of the formed resin into butanol, the solution is washed out with water and distilled until the temperature of the heated mass reaches 150° C. Through rendering the washing waters acidic 8.2 parts dihydroxydiphenylpropane are recovered. The epoxide number of the resin (EpZ), which is defined as the percent-content of oxygen bound epoxidically, is 2.00.

Fifty (50) parts of this resin are heated, after solution in ethylene glycol, with 30 parts of triethylenetetramine for 1 hour to 100° C. Subsequently the resulting material is subjected to distillation in a vacuum up to a temperature of 250° C. whereby the excess of the polyamine is forced over with the distillate.

The hardener thus obtained, designated hereafter as adduct A, is combined with various epoxy resins having an epoxy equivalent larger than 1. The hardening with the various quantity ratios, temperatures and heating periods follows from the following summary. In the summary, as a criterion for thorough hardening it is assumed that a film with a 50μ thickness on sheet metal must be able to withstand three 50 cm. falls on a Niesen apparatus without damage.

For the hardening of an epoxy resin with a molecular weight 1600 and EpZ 1.6 about 15–30% adduct A are necessary. The curing of stoving periods require 60 minutes at 70° C. and about 15 minutes at 100° C., 150° C., 170° C. or 190° C. At 20° C. hardening is obtained only after several days. The utilization period of a coating solution is about 30–40 hours.

An epoxy resin with a molecular weight of 1000 and EpZ 3.8 hardens through, after addition of 20–50% of adduct A, at the temperatures indicated. The prepared solution is usable for 21 hours. Under the same conditions, an epoxy resin with a molecular weight of 550 and an EpZ of 6.1 hardens through after addition of 30–50% adduct A; however, at 70° C. a curing period of 120 minutes and at 100° C. a curing period of 45 minutes are necessary.

*Example 2*

In the same manner as with Example 1, 114 parts p,p'-dihydroxydiphenylpropane are condensed in the presence of 360 parts of a 5% sodium hydroxide solution with 41.5 parts epichlorhydrin. The adduct formation with 90 parts triethylenetetramine takes place (a) after incorporation of the resin in butanol, (b) after completion of the condensation without solvents by heating to 100° C. In the first case, a resin with a nitrogen content of 7.5% and in the second case such a resin with a 5.0% nitrogen content are obtained.

Both resins have the same usability as hardeners for epoxy resins.

*Example 3*

An adduct is produced as in Example 1, namely, by reacting an epoxy resin derived from 1 mol of p,p'-dihydroxydiphenylpropane and 0.9 mol epichlorhydrin in butanol with 130, 100, 70, 50 and 10 parts, respectively, of triethylenetetramine by boiling at 100° C., washing with water and vacuum distillation of the adducts up to 230° C. No hardening takes place and readily soluble adducts are obtained having the following nitrogen content: 5.19%, 4.84%, 3.63%, 2.73%, 2.2%, 1.3%. In contrast to this, it is not possible with such small quantities of triethylenetetramine to manufacture soluble adducts of epoxy resins with an epoxy equivalent larger than 1. The hardening effect falls off in proportion to the nitrogen content so that one is compelled to use for hardening larger portions of the adducts poorer in nitrogen.

Example 4

In the place of triethylenetetramine, diethylenetriamine, dipropylenetriamine and ethylenediamine are used for adduct formation. By the use of excess quantities of these polyamines and by removal of the unbonded parts through vacuum distillation, hardening resins with the following nitrogen contents are obtained: 3.2%, 3.7% and 2.3% respectively. All these adducts are capable of converting epoxy resins capable of being hardened into completely water-fast and chemically inert products. With a 50% addition of adduct one needs, for instance, heating for 30 minutes to 150° C.

Example 5

Two hundred (200) parts p,p'-dihydroxydiphenylmethane are condensed, in 640 parts of a 10% sodium hydroxide solution, with 103 weight parts α-dichlorhydrin. The adduct formation takes place by heating with triethylenetetramine in butanol solution, as described in the preceding examples. After distillation a resin is obtained which has a good hardening effect.

Example 6

After dissolving 220 parts of resorcinol in 360 parts of a 10% sodium hydroxide solution, it is reacted with 83 parts of epichlorhydrin at 40° C. After the temperature has been raised within 30 minutes to 70° C., 90 parts of triethylenetetramine are added with further heating. The reaction product is washed out well and distilled in vacuum until the temperature of the heated material reaches 150° C. A resin is obtained with a 45 to 50° C. melting point which is excellently suited for the hardening of epoxy resins as proven by the following results:

An epoxy resin with a molecular weight of about 1000 and EpZ 3.8 is combined with 20, 30 and 50% respectively, of the above resin hardener in a butylglycol solution. All combinations, after 15 minutes of curing or stoving at 150° C. and 180° C., respectively, lead to hard, elastic, acid-stable and long-lasting films. At 100° C., to be sure, 20% to 30% longer hardening periods are needed for the hardening of the combinations. At 70° C., even longer hardening periods are required; for instance, about 45 minutes may be required. At 70° C. the 50% combination must also be hardened for a longer period than 15 minutes. The utilization period of lacquer solutions is more than 15 hours.

The practice of this invention has been exemplified by various details and illustrative embodiments. It will be understood, however, that the hardenable epoxy resins used in this invention are known in the art and that the details as disclosed may be varied extensively by additions, substitutions or omissions without departing from the scope or spirit of the invention which is the intended purpose of the appended claims.

What is claimed is:

1. An adduct of an alkylene polyamine of 2–3 carbon atoms in the alkylene radical with an epoxy resin having an epoxy-equivalent less than 1 derived from a dihydroxyphenol and 0.5 to 0.9 molar proportion of a halogenhydrin selected from the group consisting of epi- and dihalogenhydrins.

2. An adduct of triethylenetetramine with an epoxy resin having an epoxy-equivalent less than 1 derived from p,p'-dihydroxydiphenylpropane and 0.5 to 0.9 molar proportion of epichlorhydrin.

3. An adduct of diethylenetriamine with an epoxy resin having an epoxy-equivalent less than 1 derived from p,p'-dihydroxydiphenylpropane and 0.5 to 0.9 molar proportion of epichlorhydrin.

4. An adduct of dipropylenetriamine with an epoxy resin having an epoxy-equivalent less than 1 derived from p,p'-dihydroxydiphenylpropane and 0.5 to 0.9 molar proportion of epichlorhydrin.

5. An adduct of ethylenediamine with an epoxy resin having an epoxy-equivalent less than 1 derived from p,p'-dihydroxydiphenylpropane and 0.5 to 0.9 molar proportion of epichlorhydrin.

6. An adduct of triethylenetetramine with an epoxy resin having an epoxy-equivalent less than 1 derived from resorcinol and 0.5 to 0.9 molar proportion of epichlorhydrin.

7. A heat hardenable epoxy resin composition containing (1) an epoxy resin having an epoxy-equivalent greater than 1 derived from a dihydroxyphenol and a halogen hydrin and (2), as a hardening agent for said epoxy resin, an adduct of an alkylene polyamine hardening agent for an epoxy resin and an epoxy resin having an epoxy-equivalent less than 1 derived from a dihydroxyphenol and a halogen hydrin reacted in a molar ratio of 1:0.5 to 0.9.

8. A heat hardenable epoxy resin composition containing (1) an epoxy resin having an epoxy-equivalent greater than 1 derived from a dihydroxyphenol and a halogen hydrin and (2), as a hardening agent for said epoxy resin, an adduct of an ethylene polyamine and an epoxy resin having an epoxy-equivalent less than 1 derived from a dihydroxyphenol and a halogen hydrin reacted in a molar ratio of 1:0.5 to 0.9.

9. A heat hardenable epoxy resin composition containing (1) an epoxy resin having an epoxy-equivalent greater than 1 derived from a dihydroxyphenol and a halogen hydrin and (2), as a hardening agent for said epoxy resin, an adduct of a propylene polyamine and an epoxy resin having an epoxy-equivalent less than 1 derived from a dihydroxyphenol and a halogen hydrin reacted in a molar ratio of 1:0.5 to 0.9.

10. A heat hardenable epoxy resin composition containing (1) an epoxy resin having an epoxy-equivalent greater than 1 derived from a dihydroxyphenol and a halogen hydrin and (2), as a hardening agent for said epoxy resin, an adduct of triethylenetetramine and an epoxy resin having an epoxy-equivalent less than 1 derived from a dihydroxyphenol and a halogen hydrin reacted in a molar ratio of 1:0.5 to 0.9.

11. A heat hardenable epoxy resin composition containing (1) an epoxy resin having an epoxy-equivalent greater than 1 derived from a dihydroxyphenol and a halogen hydrin and (2), as a hardening agent for said epoxy resin, an adduct of an alkylene polyamine hardening agent for an epoxy resin and an epoxy resin having an epoxy-equivalent less than 1 derived from p,p'-dihydroxydiphenylpropane and epichlorhydrin reacted in a molar ratio of 1:0.5 to 0.9.

12. A process for preparing a normally stable but heat hardenable epoxy resin composition which comprises intimately mixing (1) an epoxy resin having an epoxy-equivalent greater than 1 derived from a dihydroxyphenol and a halogen hydrin and (2), as a hardening agent for said epoxy resin, an adduct of an alkylene polyamine hardening agent for an epoxy resin and an epoxy resin having an epoxy-equivalent less than 1 derived from a dihydroxyphenol and a halogen hydrin reacted in a molar ratio of 1:0.5 to 0.9.

13. A process for preparing a heat hardenable coating composition having good pot life, which comprises forming said composition by incorporating in an organic solvent (1) an epoxy resin having an epoxy-equivalent greater than 1 derived from a dihydroxyphenol and a halogen hydrin and (2), as a hardening agent for said epoxy resin, an adduct of an alkylene polyamine hardening agent for an epoxy resin and an epoxy resin having an epoxy-equivalent less than 1 derived from a dihydroxyphenol and a halogen hydrin reacted in a molar ratio of 1:0.5 to 0.9.

14. A process for forming heat hardened epoxy resins compositions which comprises intimately admixing (1) an epoxy resin having an epoxy-equivalent greater than 1 derived from a dihydroxyphenol and a halogen hydrin and (2), as a hardening agent for said epoxy resin, an adduct of an alkylene polyamine hardening agent for an epoxy resin and an epoxy resin having an epoxy-equivalent less than 1 derived from a dihydroxyphenol and a halogen hydrin reacted in a molar ratio less than 1:1 of about 0.5 to 0.9:1, and heating the formed admixture to a hardening temperature between about 50–170° C.

References Cited in the file of this patent

UNITED STATES PATENTS 2,767,157     Master _____ Oct. 16, 1956

FOREIGN PATENTS 691,543     Great Britain _____ May 13, 1953

OTHER REFERENCES

Rouse: "Curing Agents for Epoxy Resin," Official Digest, November 1953, page 826.

UNITED STATES PATENT OFFICE

CERTIFICATE OF CORRECTION

Patent No. 2,906,723                                      September 29, 1959

Johannes Reese

It is hereby certified that error appears in the printed specification of the above numbered patent requiring correction and that the said Letters Patent should read as corrected below.

Column 1, line 43, for "than on" read -- than one --; column 3, line 52, after "hardenable" insert -- epoxy resin or --.

Signed and sealed this 29th day of March 1960.

(SEAL)
Attest:

KARL H. AXLINE                                                  ROBERT C. WATSON
Attesting Officer                                         Commissioner of Patents